(12) United States Patent
Sood et al.

(10) Patent No.: US 11,765,032 B1
(45) Date of Patent: Sep. 19, 2023

(54) SHIFTING LEFT GRC AND SECURITY COMPLIANCE LEVERAGING TRANSIENT CLOUD RESOURCES

(71) Applicant: INTERNATIONAL BUSINESS MACHINES CORPORATION, Armonk, NY (US)

(72) Inventors: Siddhartha Sood, Ghaziabad (IN); Balakrishan Sreenivasan, Jayanagar (IN); Roopa Wilson, Bangalore (IN); Richard Daniel Gunjal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/977,063

(22) Filed: Oct. 31, 2022

(51) Int. Cl.
*G06F 15/173* (2006.01)
*H04L 41/0869* (2022.01)
*H04L 41/0895* (2022.01)

(52) U.S. Cl.
CPC ...... *H04L 41/0869* (2013.01); *H04L 41/0895* (2022.05)

(58) Field of Classification Search
CPC .......... H04L 41/0869; H04L 41/0895
See application file for complete search history.

(56) References Cited

U.S. PATENT DOCUMENTS

| | | | |
|---|---|---|---|
| 9,419,913 B2 | 8/2016 | Ferris et al. | |
| 10,484,430 B2 * | 11/2019 | Prasad | H04L 63/107 |
| 10,541,938 B1 * | 1/2020 | Timmerman | H04L 43/065 |
| 2012/0011077 A1 * | 1/2012 | Bhagat | G06Q 10/0635 |
| | | | 705/317 |
| 2019/0104156 A1 | 4/2019 | Barkovic et al. | |
| 2020/0192926 A1 | 6/2020 | Arora et al. | |
| 2020/0257700 A1 * | 8/2020 | Xu | G06F 8/65 |
| 2021/0168128 A1 | 6/2021 | Carru et al. | |
| 2022/0046059 A1 | 2/2022 | Pandurangi et al. | |

* cited by examiner

*Primary Examiner* — Richard G Keehn
(74) *Attorney, Agent, or Firm* — Tutunjian & Bitetto, P.C.; Rajesh Roy (57) ABSTRACT

A method for Governance, Risk, Compliance (GRC) and security compliance in a cloud computing environment is provided. The method includes maintaining a cloud resource to be in a transient state that keeps the cloud resource from being visible to other cloud resources for a configured rule driven duration during which validations comprising the GRC and security compliance are applied to the cloud resource. The method further includes provisioning the cloud resource responsive to the cloud resource meeting a time-in-transient-state requirement and passing the GRC and security compliance. The maintaining step includes reusing reactive validations for further GRC and security compliance in a resource lifecycle leveraging Application Programming Interface (API) based lifecycle events during the transient state, and deriving a next set of configurable actions for provisioned resources by providing hooks to a provisioning service to get a compliance posture for the cloud resource in the transient state.

20 Claims, 9 Drawing Sheets

SHIFTING LEFT GRC AND SECURITY COMPLIANCE LEVERAGING TRANSIENT CLOUD RESOURCES

BACKGROUND

The present invention generally relates to cloud computing, and more particularly to shifting left Governance, Risk, Compliance (GRC) and security compliance leveraging transient cloud resources.

GRC and security are critical capabilities for all enterprises (large or small) on their journey to cloud. As cloud computing has evolved, so has the need for security and the ability to manage and govern all aspects of it. Organizations are under tremendous pressure to ensure that resources provisioned within enterprise cloud environments are both secure and compliant to enterprise security best practices and established guard rails.

Hence, there is a need for enhanced GRC and security compliance.

SUMMARY

According to aspects of the present invention, a computer-implemented method for Governance, Risk, Compliance (GRC) and security compliance in a cloud computing environment is provided. The method includes maintaining, by a hardware processor, a cloud resource to be in a transient state that keeps the cloud resource from being visible to other cloud resources for a configured rule driven duration during which validations comprising the GRC and security compliance are applied to the cloud resource. The method further includes provisioning, by the hardware processor, the cloud resource responsive to the cloud resource meeting a time-in-transient-state requirement and passing the GRC and security compliance. The maintaining step includes reusing reactive validations for further GRC and security compliance in a resource lifecycle leveraging Application Programming Interface (API) based lifecycle events during the transient state, and deriving a next set of configurable actions for provisioned resources by providing hooks to a provisioning service to get a compliance posture for the cloud resource in the transient state.

According to other aspects of the present invention, a computer program product for Governance, Risk, Compliance (GRC) and security compliance in a cloud computing environment is provided. The computer program product includes a non-transitory computer readable storage medium having program instructions embodied therewith. The program instructions are executable by a computer to cause the computer to perform a method. The method includes maintaining, by a hardware processor, a cloud resource to be in a transient state that keeps the cloud resource from being visible to other cloud resources for a configured rule driven duration during which validations comprising the GRC and security compliance are applied to the cloud resource. The method further includes provisioning, by the hardware processor, the cloud resource responsive to the cloud resource meeting a time-in-transient-state requirement and passing the GRC and security compliance. The maintaining step includes reusing reactive validations for further GRC and security compliance in a resource lifecycle leveraging Application Programming Interface (API) based lifecycle events during the transient state, and deriving a next set of configurable actions for provisioned resources by providing hooks to a provisioning service to get a compliance posture for the cloud resource in the transient state.

According to other aspects of the present invention, a computer processing system for Governance, Risk, Compliance (GRC) and security compliance in a cloud computing environment is provided. The computer processing system includes a memory device for storing program code. The computer processing system further includes a hardware processor operatively coupled to the memory device for running the program code to maintain a cloud resource to be in a transient state that keeps the cloud resource from being visible to other cloud resources for a configured rule driven duration during which validations comprising the GRC and security compliance are applied to the cloud resource. The hardware processor further runs the program code to provision the cloud resource responsive to the cloud resource meeting a time-in-transient-state requirement and passing the GRC and security compliance. The hardware processor maintains the cloud resource in the transient state by running the program code to reuse reactive validations for further GRC and security compliance in a resource lifecycle leveraging Application Programming Interface (API) based lifecycle events during the transient state, and derive a next set of configurable actions for provisioned resources by providing hooks to a provisioning service to get a compliance posture for the cloud resource in the transient state.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to shifting left Governance, Risk, Compliance (GRC) and security compliance leveraging transient cloud resources.

Considering different levels of maturity for cloud native infrastructure GRC and security compliance, embodiments of the present invention involve creating cloud resources in a transient state, wherein the cloud in the transient state is a pre-provisioned (yet to be provisioned) cloud resource, where they are not visible to other cloud services for a specified (configurable) duration of time. During this time, existing cloud provider security services (configurable) or 3Y party services (configurable) would be able to validate these resources for compliance similar to how these services would work on provisioned resources.

In embodiments of the present invention, hooks can be provided to the provisioning service to get compliance posture for these transient resources which would be further used to derive a next set of actions (configurable) for these provisioned resources.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
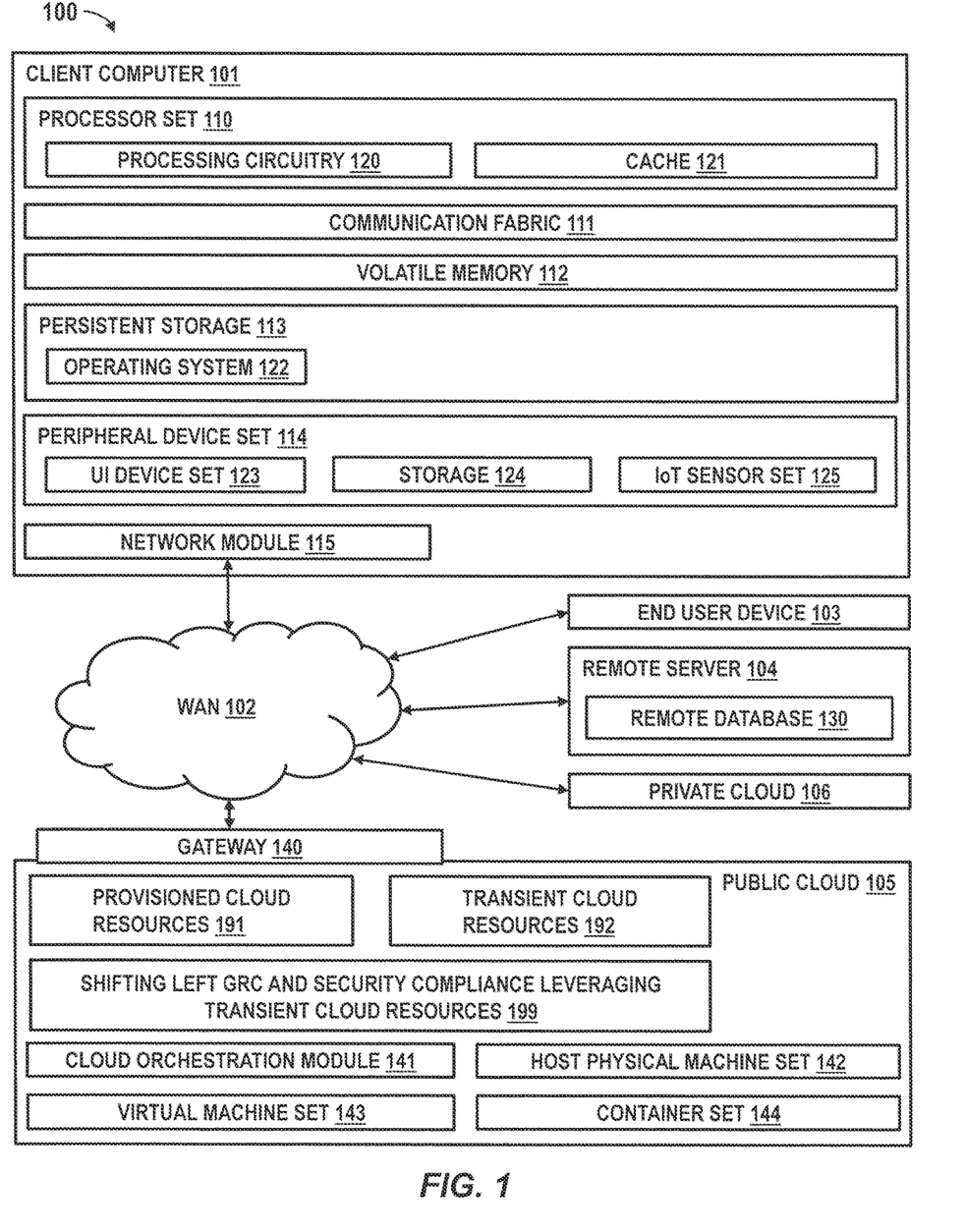
FIG. 1 is a block diagram of a computing environment, in accordance with an embodiment of the present invention.

FIG. 1 is a block diagram of a computing environment 100, in accordance with an embodiment of the present invention.

Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102. Public cloud 105 contains an example of an environment for the execution of at least some of the computer code involved in performing the inventive methods, such as shifting left GRC and security compliance leveraging transient cloud resources 199. Public cloud 105 also includes transient cloud resources 192—These represent transient cloud resources on which GRC compliance checks will be executed in accordance with an embodiment of the present invention. Public cloud 105 also includes provisioned cloud resources 191—These represent provisioned cloud resources on which GRC compliance checks have been executed and successfully passed in accordance with an embodiment of the present invention. While shown in public cloud 105, the inventive methods can also be used in the private cloud 106 described below. As such, private cloud 106 can also include the transient cloud resources 191 and the provisioned cloud resources 192. These and other variations of the present invention are readily contemplated by one of ordinary skill in the art given the teachings of the present invention provided herein.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
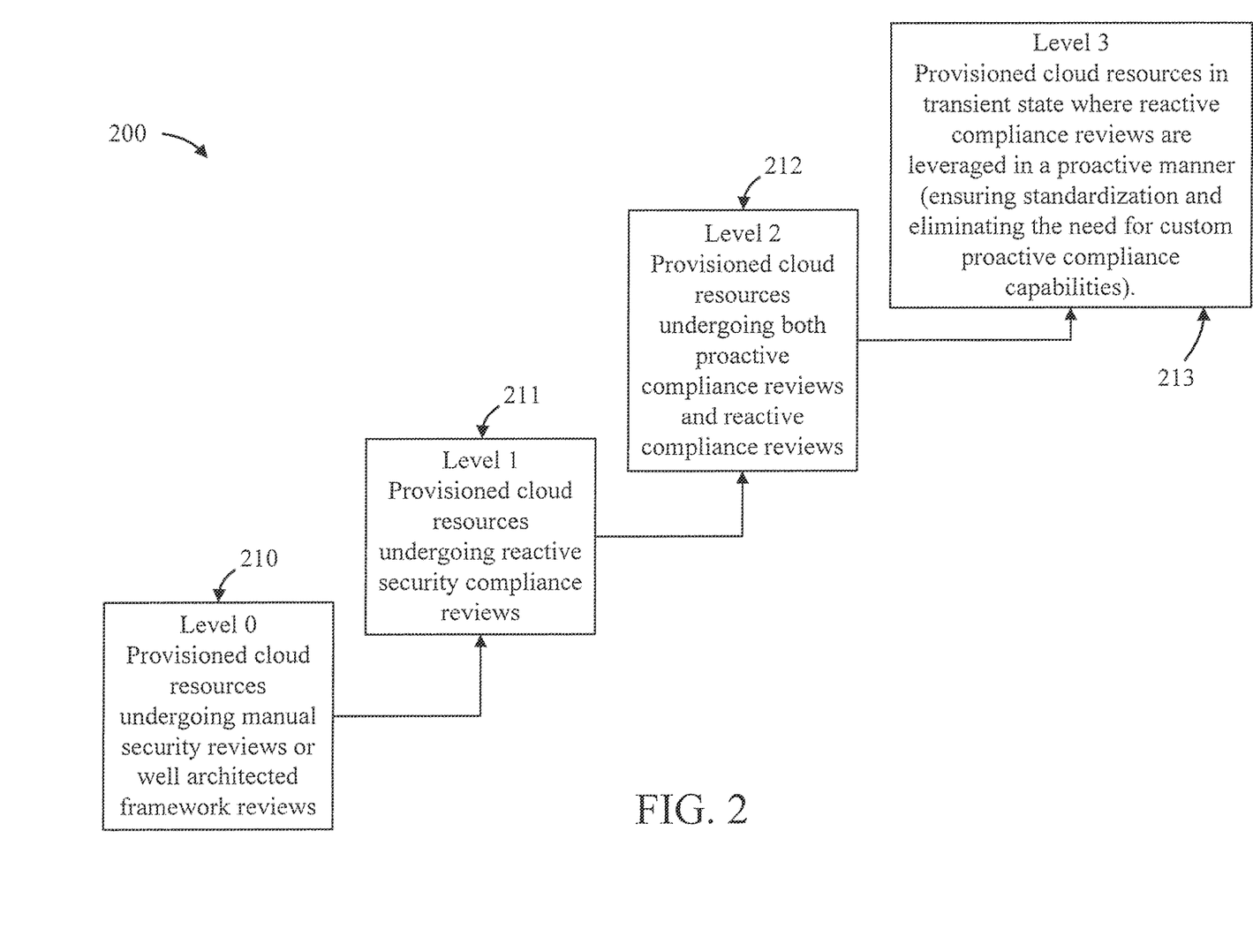
FIG. 2 is a block diagram showing exemplary maturity levels for cloud native infrastructure GRC and security compliance, in accordance with an embodiment of the present invention.

FIG. 2 is a block diagram showing exemplary maturity levels 200 for cloud native infrastructure GRC and security compliance, in accordance with an embodiment of the present invention.

At a maturity level 0 (210), provisioned cloud resources undergo manual security reviews or well architected framework reviews.

At a maturity level 1 (211), provisioned cloud resources undergo reactive security compliance reviews. Examples include Amazon Web Services® (e.g., AWS® config), Microsoft® web services (e.g., Azure® Policy and Azure® Security Control), and Google® web services (e.g., Google® Cloud Asset Inventory).

At a maturity level 2 (212), provisioned cloud resources undergo both proactive compliance reviews and reactive compliance reviews.

At a maturity level 3 (213), corresponding to one or more embodiments of the present invention, provisioned cloud resources in a transient state where reactive compliance reviews are leveraged in a proactive manner (ensuring standardization and eliminating the need for custom proactive compliance capabilities).

Embodiments of the present invention allow cloud service providers, enterprises, and open-source enthusiasts to focus on the same set of core capabilities and skill dimensions without the need to create bespoke and custom solution and a plurality of approaches that are difficult to manage and scale.

Embodiments of the present invention consider multiple levels of GRC and security compliance for an enterprise. To illustrate the differences between the present invention (maturity level 3) and the lower maturity levels, the lower maturity levels will further be explained.

Level 0—Traditional manual and reactive approach

Figure 3:
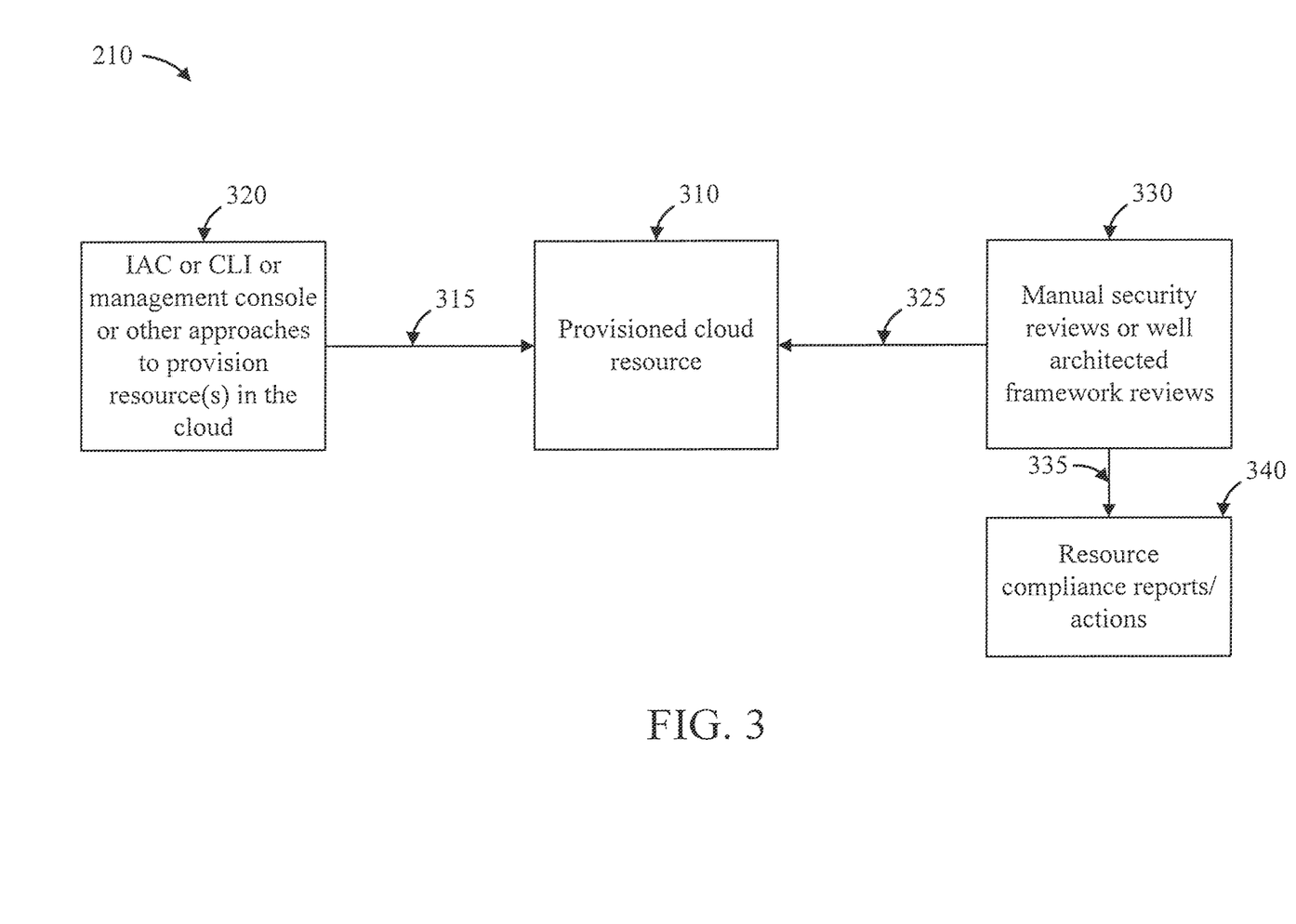
FIG. 3 is a block diagram showing a maturity level 0, in accordance with an embodiment of the present invention.

FIG. 3 is a block diagram showing a maturity level 0 (210), in accordance with an embodiment of the present invention.

At level 0, organizations could provision cloud resources 310 through any of the available capabilities such as Infra as Code (IAC), Command Line Interface (CLI) or cloud console or other resource provisioning approaches 320 and typically leverage manual security and compliance reviews 330 on provisioned cloud resources 310 and produce outcomes such as reports, compliance posture and actions 340. These reviews can be done by internal enterprise teams or specialized 3$^{rd}$ parties. Arrow 315 denotes execution and provisioning. Arrow 325 denotes validating a resource against security policies. Arrow 335 denotes generation of the report, compliance posture and actions 340.

Level 1—Traditional Reactive & automated approach

Figure 4:
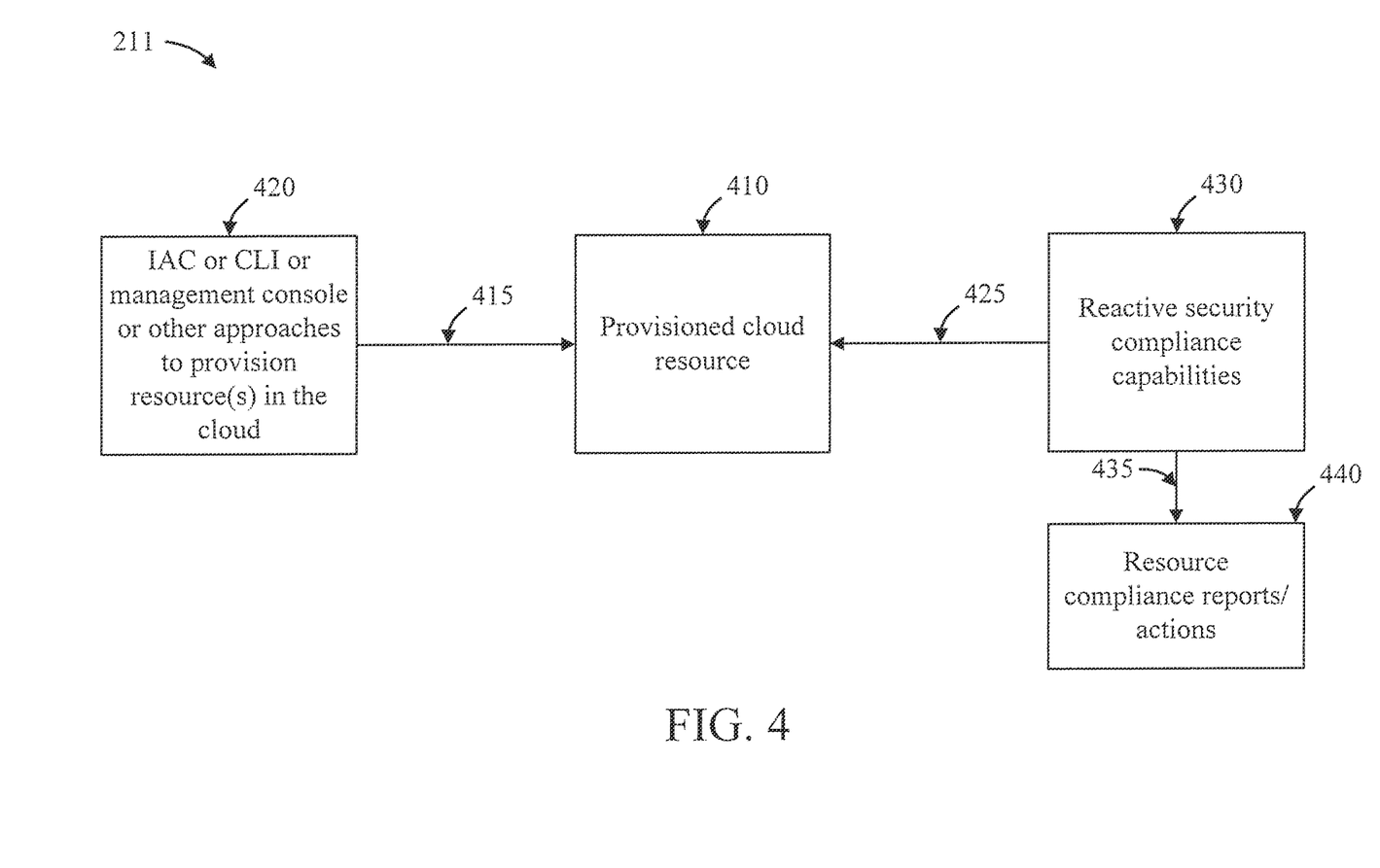
FIG. 4 is a block diagram showing a maturity level 1, in accordance with an embodiment of the present invention.

FIG. 4 is a block diagram showing a maturity level 1 (211), in accordance with an embodiment of the present invention.

At level 1, organizations could provision cloud resources 410 through any of the available capabilities such as IAC, CLI or cloud console or other resource provisioning approaches 420 and typically leverage reactive automated security and compliance reviews 430 on provisioned cloud resources 410 and produce outcomes such as reports, compliance posture and actions 440. Examples of such automated reactive approaches could be leveraging capabilities and services such as AWS® config, GCP Asset Inventory or Azure® Policy. Organizations benefit from an automated approach and continuous compliance as new resources are provisioned or existing resources are modified along with the ability to automatically remediate non-compliant resources example by deprovisioning them or correcting the security flaw (example disabling a port). Arrow 415 denotes execution and provisioning. Arrow 425 denotes validating a resource against security policies. Arrow 435 denotes generation of the report, compliance posture and actions 440.

Figure 5:
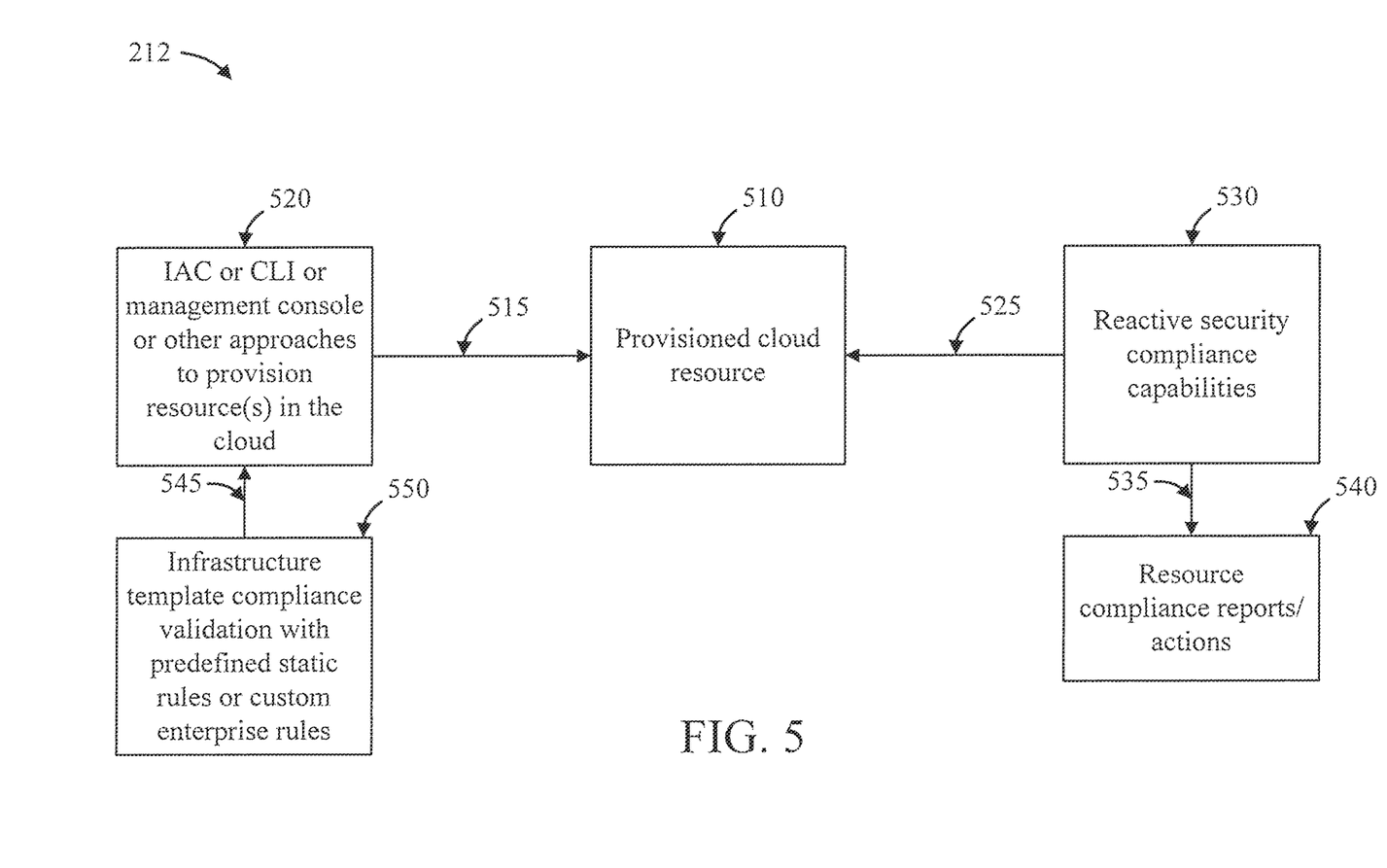
FIG. 5 is a block diagram showing a maturity level 2, in accordance with an embodiment of the present invention.

Level 2—Shift left proactive approach complementing the reactive approach to security and compliance FIG. 5 is a block diagram showing a maturity level 2 (212), in accordance with an embodiment of the present invention.

At level 2, organizations could provision cloud resources 510 through any of the available capabilities such as IAC, CLI or cloud console or other resource provisioning approaches 520 and typically leverage both proactive & reactive automated security and compliance reviews 530 on provisioned cloud resources and produce outcomes such as reports, compliance posture and actions 540. Arrow 515 denotes execution and provisioning. Arrow 525 denotes validating a resource against security policies. Arrow 535 denotes generation of the report, compliance posture and actions 540.

Examples of such automated proactive capabilities could be IaC (Infrastructure as Code) template validation and compliance assurance frameworks such as AWS® Cloud formation guard or Checkov that look at infrastructure definition and apply rules on top of those to identify vulnerabilities. These do not remediate any vulnerabilities however could provide recommendations for remediation.

Examples of such automated reactive approaches could be leveraging capabilities and services such as AWS® config, GCP Asset Inventory or Azure® Policy. Organizations benefit from an automated approach and continuous compliance as new resources are provisioned or existing resources are modified along with the ability to automatically remediate non-compliant resources example by deprovisioning them or correcting the security flaw (for example, disabling a port, etc.).

Figure 6:
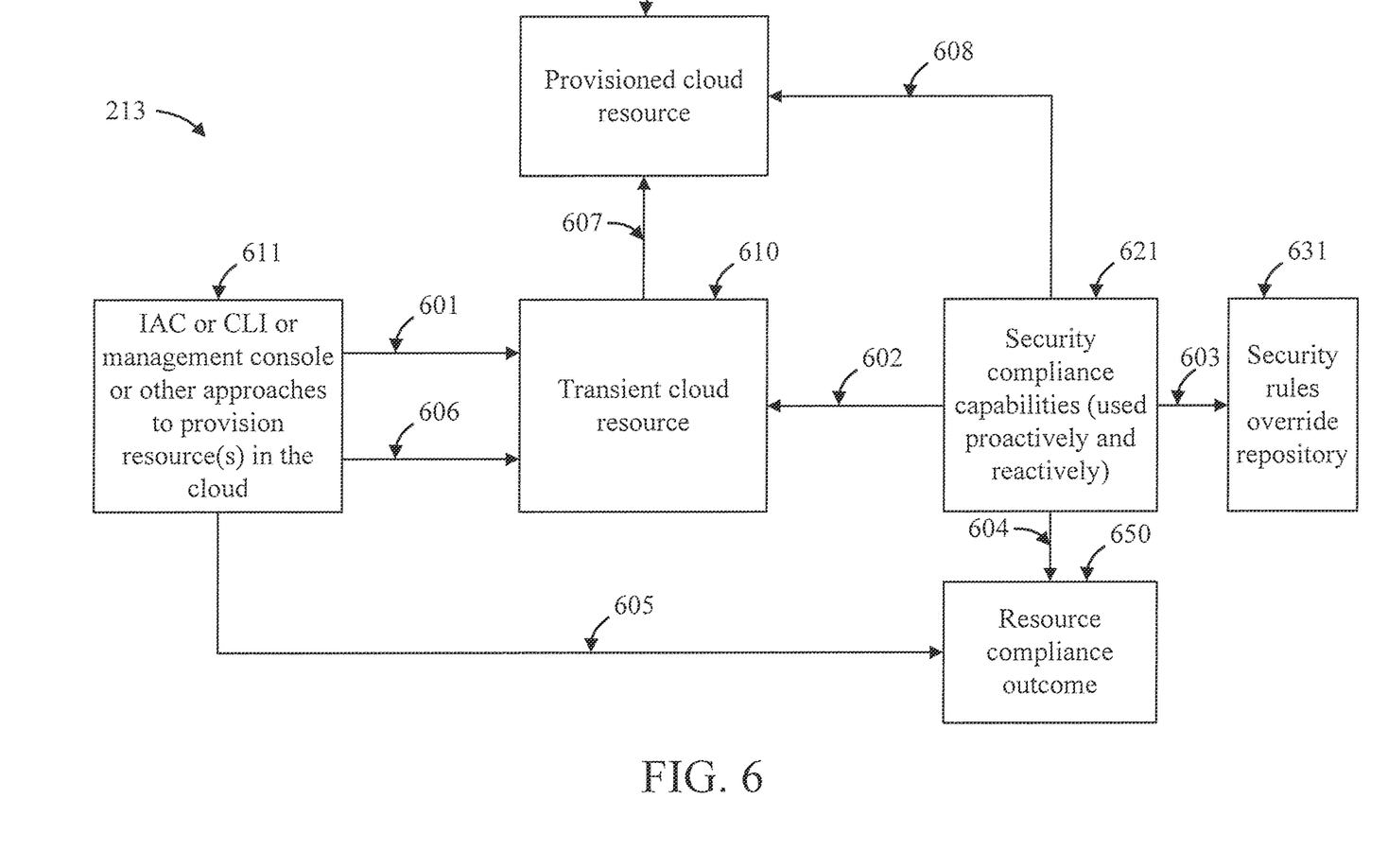
FIG. 6 is a block diagram showing a maturity level 3, in accordance with an embodiment of the present invention.

Level 3—Transient cloud resources leveraging cloud native reactive compliance as proactive compliance FIG. 6 is a block diagram showing a maturity level 3 (213), in accordance with an embodiment of the present invention.

Maturity level 3 considers the following aspects:

(Arrow/step 601) IAC (Infra as Code) or CLI or Management console or other cloud resource provisioning approaches 611 that provision a transient resource in a cloud through a cloud service provider tooling.

(Arrow/step 602) Reactive security & compliance capabilities 621 that are already built in with cloud service provider tooling is triggered and validates transient resources against provided security policies.

(Arrow/step 603) As part of resource validation, the compliance can also lookup any security override rules that will override certain rules for specialized conditions with respect to a security rules override repository 631.

(Arrow/step 604) Reactive security & compliance capabilities 621 generate the compliance review outcomes 650.

(Arrow/step 605) Resource provisioner (such as IaC) 611 will validate resource compliance outcomes that are generated in step 604.

(Arrow/step 606) Once compliance is validated, resource provisioner 611 will request the transient resource 610 to be transitioned to a provisioned resource 620. On a contrary, invalidated resources could cause reverse impact example failure of action or failure of build.

(Arrow/step 607) The transient resource 610 is provisioned to become the provisioned resource 620.

(Arrow/step 608) The security compliance that was earlier (step 602) was used to validate the resource continues to continuously validate the resource and confirm compliance.

Figure 7:
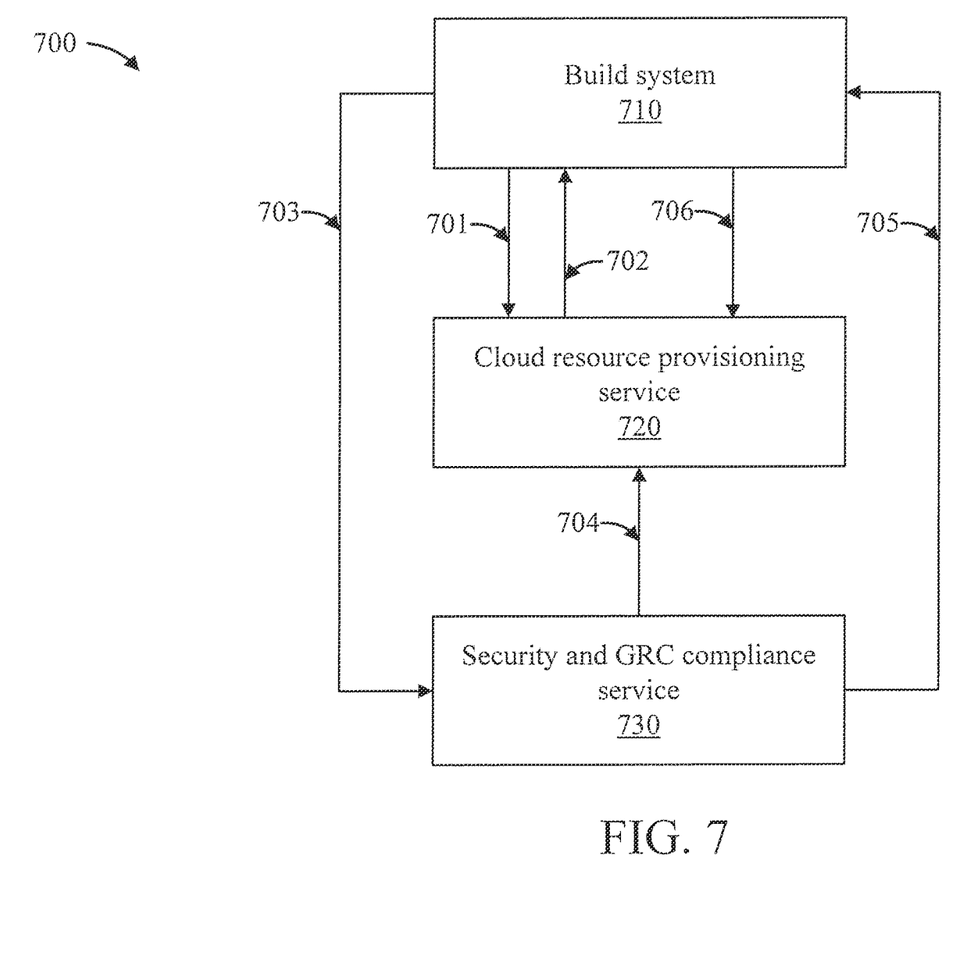
FIG. 7 is a block diagram showing an exemplary cloud use case, in accordance with an embodiment of the present invention.

FIG. 7 is a block diagram showing an exemplary cloud use case 700, in accordance with an embodiment of the present invention.

The cloud use case 700 involves a build system 710, a cloud resource provisioning service 720, and a security and GRC compliance service 730.

The cloud use case 700 involves a build system 710, a cloud resource provisioning service 720, and a security and GRC compliance service 730.

(Arrow/step 701) represents an automated build system 710 that leverages IAC (Infra as Code) templates to automatically initiate cloud resource provisioning to the cloud resource provisioning service 720

(Arrow/step 702), One request is received from step 701, The cloud resource provisioning service 720 provisions a transient cloud resource and the build system 710 receives a time bound transient resource back.

(Arrow/step 703), The build system 710 Trigger compliance checks on transient cloud resource (i.e., cloud resource in transient state) though the reactive GRC compliance services 730 that would already be existing within the ecosystem.

(Arrow/step 704) The GRC compliance service 730 receives the compliance execution from build system 710 and execute check on transient cloud resource.

(Arrow/step 705) The build system 710 receive outcomes of security and compliance checks post the execution of GRC compliance rules by the GRC compliance Services 730.

(Arrow/step 706) Once the build system 710 receives a positive affirmation from GRC compliance services 730 that all compliance rules have passed, the build system 710 requests the cloud resource provisioning service 720 to transition transient cloud resource to provisioned cloud resource.

Figure 8:
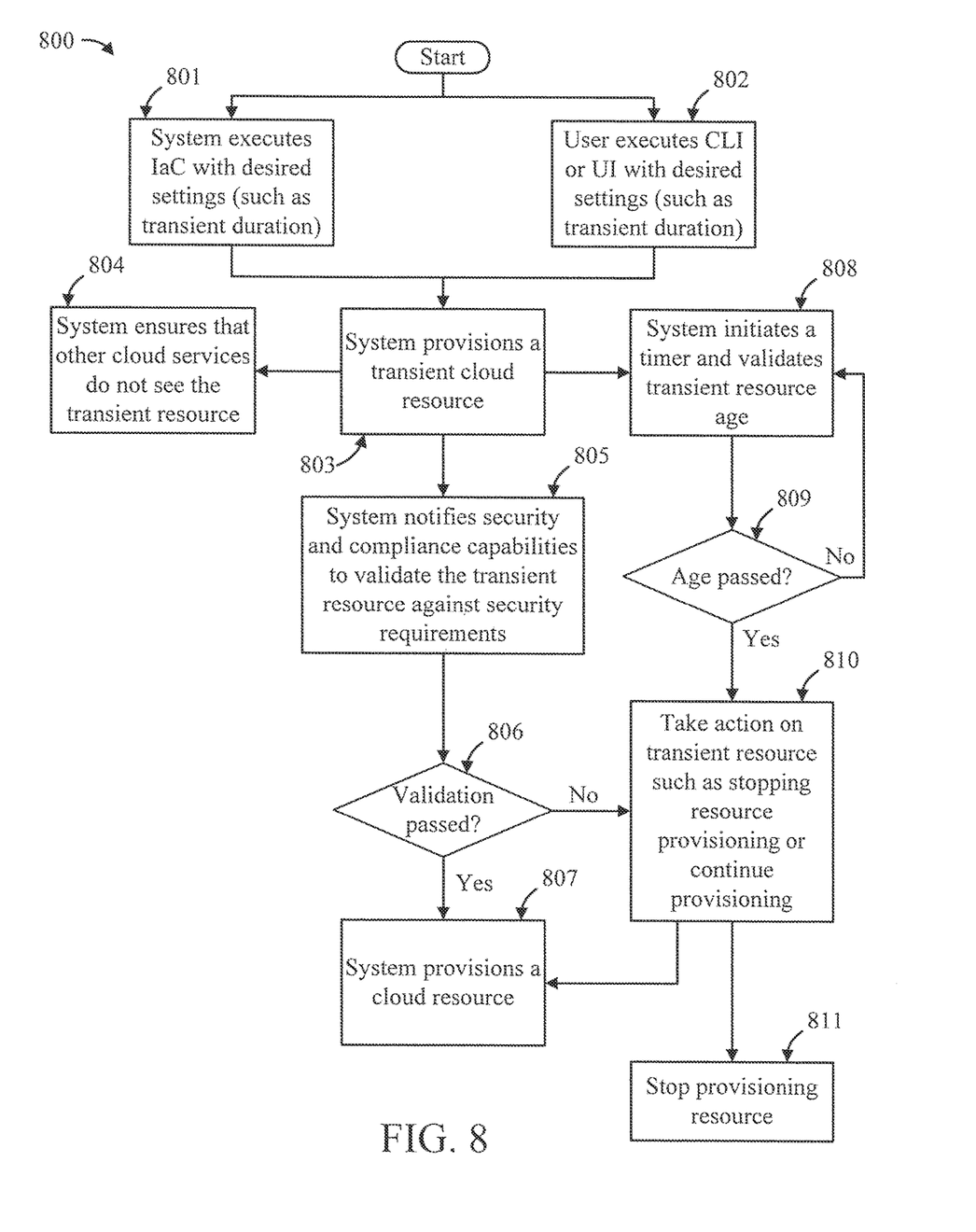
FIG. 8 is a flow diagram showing an exemplary method for Governance, Risk, Compliance (GRC) and security compliance in a cloud computing environment, in accordance with an embodiment of the present invention.

FIG. 8 is a flow diagram showing an exemplary method 800 for Governance, Risk, Compliance (GRC) and security compliance in a cloud computing environment, in accordance with an embodiment of the present invention.

At block 801, execute, by the system, IaC with desired settings (such as transient duration). The system is provided a set of IaC templates which are designated to create a transient resource(s) for a specified configurable duration.

At block 802, execute, by the user, CLI or UI with desired settings (such as transient duration), as an alternative to block 801. The system is providing a set of resource provisioning instructions via CLI or UI which are designated to create transient resource(s) for a specified configurable duration.

At block 803, provision, by the system, a transient cloud resource based on the instructions provided in a prior block. The system will provision a cloud resource but match the resource lifecycle status as transient. Once completed, the system will perform block 804 or block 808 in parallel.

At block 804, ensure, by the system, that other cloud services do not see the transient resource. The system will manage this through the configuration for services v/s transient resources visibility. Other services will be unable to see the transient resource.

At block 805, notify, by the system, the security and compliance capabilities to validate the transient resource against security requirements. The system can create such notifications/interactions via direct API calls or via an eventing mechanism where downstream services could subscribe to such events and perform actions.

At block 806, check, by the system, if the compliance check passes in the transient resource. If so, then proceed to block 807. Otherwise, proceed to block 810.

At block 807, provision, by the system, a cloud resource. System perform the next steps post successful compliance validation. One such next step could be about provisioning the desired cloud resource.

At block 808, initiate, by the system, a timer and validate a transient resource age. This is performed to ensure that resource does not stay in transient state forever. If no action is provided for the resource to change its state then the resource could be deprovisioned once the age has passed the threshold provided.

At block 809, determine if the transient resource age passed. If so, then proceed to block 810. Otherwise, return to block 808.

At block 810, take action on Transient Resources such as stopping resource provisioning or continue provisioning.

At block 811, stop resource provisioning.

Figure 9:
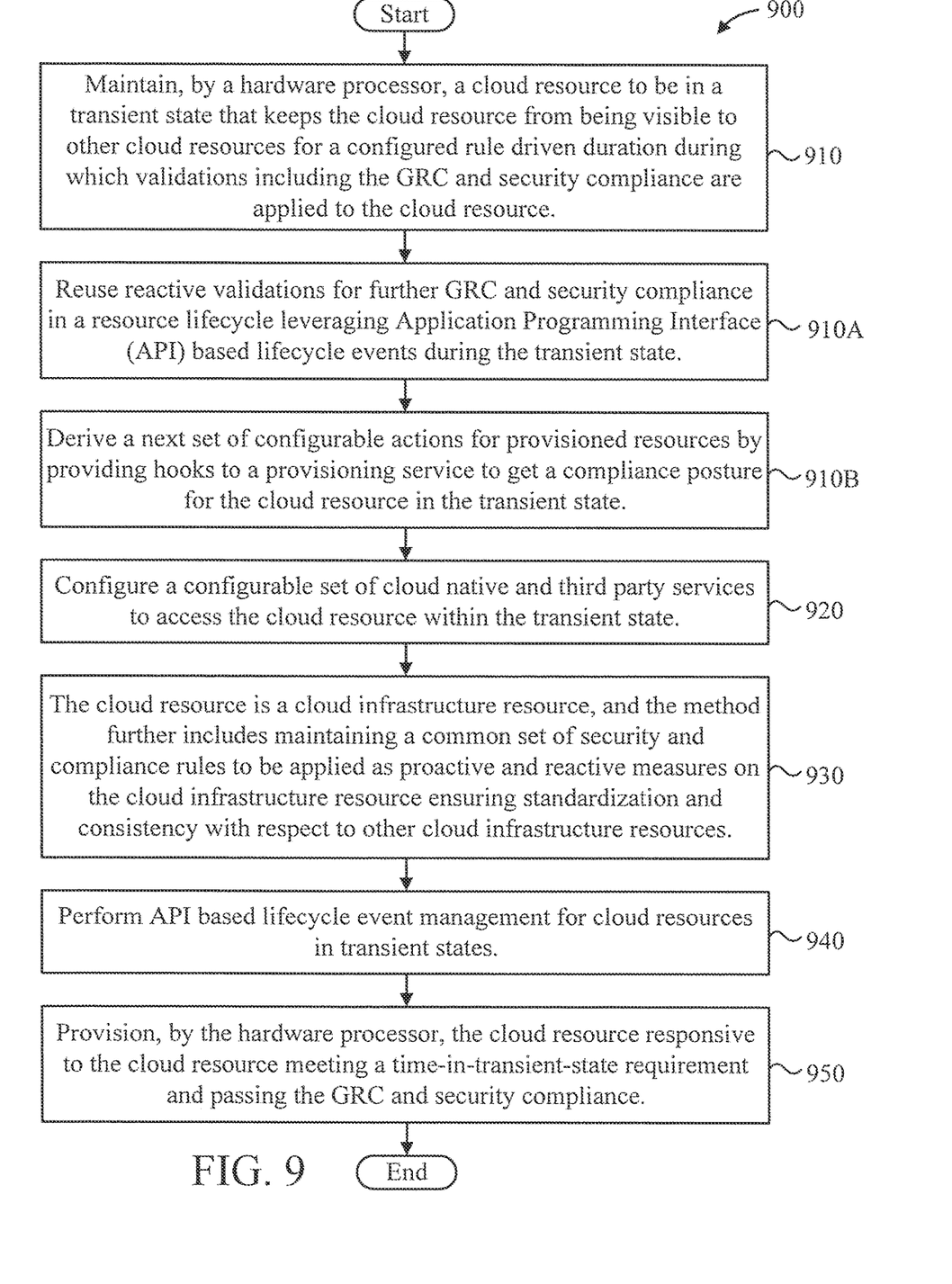
FIG. 9 is a flow diagram showing another exemplary method for Governance, Risk, Compliance (GRC) and security compliance in a cloud computing environment, in accordance with an embodiment of the present invention.

FIG. 9 is a flow diagram showing another exemplary method 900 for Governance, Risk, Compliance (GRC) and security compliance in a cloud computing environment, in accordance with an embodiment of the present invention.

At block 910, maintain, by a hardware processor, a cloud resource to be in a transient state that keeps the cloud resource from being visible to other cloud resources for a configured rule driven duration during which validations including the GRC and security compliance are applied to the cloud resource.

In an embodiment, block 910 includes one or more of blocks 910A through 910B.

At block 910A, reuse reactive validations for further GRC and security compliance in a resource lifecycle leveraging Application Programming Interface (API) based lifecycle events during the transient state.

At block 910B, derive a next set of configurable actions for provisioned resources by providing hooks to a provisioning service to get a compliance posture for the cloud resource in the transient state.

At block 920, configure a configurable set of cloud native and third party services to access the cloud resource within the transient state.

At block 930, the cloud resource is a cloud infrastructure resource, and the method further includes maintaining a common set of security and compliance rules to be applied as proactive and reactive measures on the cloud infrastructure resource ensuring standardization and consistency with respect to other cloud infrastructure resources.

At block 940, perform API based lifecycle event management for cloud resources in transient states.

At block 950, provision, by the hardware processor, the cloud resource responsive to the cloud resource meeting a time-in-transient-state requirement and passing the GRC and security compliance.

A description will now be given of some exemplary use cases, in accordance with an embodiment of the present invention.

Cloud Infrastructure is being provisioned via a CI/CD pipeline leverage infrastructure definition via templates. The pipeline (build system) leverages and integrates with cloud compliance services to validate infrastructure compliance before provisioning. The compliance passes and the infrastructure components are provisioned.

Cloud Infrastructure is being provisioned via a CI/CD pipeline leverage infrastructure definition via templates. The pipeline (Build system) leverages and integrates with cloud compliance services to validate infrastructure compliance before provisioning. The compliance failed and the build system fails.

Cloud Infrastructure is being provisioned via a management console leveraging configuration wizard. The management console leverages and integrates with cloud compliance services to validate infrastructure compliance before provisioning. The compliance passes and the infrastructure components are provisioned.

Cloud Infrastructure is being provisioned via a management console leveraging configuration wizard. The management console leverages and integrates with cloud compliance services to validate infrastructure compliance before provisioning. The compliance fails and the error message is shown stopping provisioning.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for Governance, Risk, Compliance (GRC) and security compliance in a cloud computing environment, comprising:
    maintaining, by a hardware processor, a cloud resource to be in a transient state that keeps the cloud resource from being visible to other cloud resources for a configured rule driven duration during which validations comprising the GRC and security compliance are applied to the cloud resource;
    provisioning, by the hardware processor, the cloud resource responsive to the cloud resource meeting a time-in-transient-state requirement and passing the GRC and security compliance;
    wherein said maintaining step comprises:
        reusing reactive validations for further GRC and security compliance in a resource lifecycle leveraging Application Programming Interface (API) based lifecycle events during the transient state; and
        deriving a next set of configurable actions for provisioned resources by providing hooks to a provisioning service to get a compliance posture for the cloud resource in the transient state.

2. The computer-implemented method of claim 1, further comprising configuring a configurable set of cloud native and third party services to access the cloud resource within the transient state for compliance checking.

3. The computer-implemented method of claim 1, wherein the cloud resource is a cloud infrastructure resource, and the method further comprises maintaining a common set of security and compliance rules to be applied as proactive and reactive measures on the cloud infrastructure resource ensuring standardization and consistency with respect to other cloud infrastructure resources.

4. The computer-implemented method of claim 1, further comprising performing API based lifecycle event management for cloud resources in transient states.

5. The computer-implemented method of claim 1, further comprising validating the cloud resource in the transient state against security overrides.

6. The computer-implemented method of claim 1, further comprising using a same set of automated tools for both proactive and reactive compliance on the cloud resource in the transient state without having to deploy separate toolsets for proactive and reactive compliance validations.

7. The computer-implemented method of claim 1, wherein the cloud in the transient state is a pre-provisioned cloud resource.

8. The computer-implemented method of claim 1, wherein the time-in-transient-state requirement uses a time threshold to ensure that the cloud resource is not in the transient state indefinitely.

9. The computer-implemented method of claim 8, further comprising deprovisioning the cloud resource in the transient state responsive to the cloud resource in the transient state failing the time threshold of the time-in-transient-state requirement.

10. A computer program product for Governance, Risk, Compliance (GRC) and security compliance in a cloud computing environment, the computer program product comprising a non-transitory computer readable storage medium having program instructions embodied therewith, the program instructions executable by a computer to cause the computer to perform a method comprising:
    maintaining, by a hardware processor, a cloud resource to be in a transient state that keeps the cloud resource from being visible to other cloud resources for a configured rule driven duration during which validations comprising the GRC and security compliance are applied to the cloud resource;
    provisioning, by the hardware processor, the cloud resource responsive to the cloud resource meeting a time-in-transient-state requirement and passing the GRC and security compliance;
    wherein said maintaining step comprises:
        reusing reactive validations for further GRC and security compliance in a resource lifecycle leveraging Application Programming Interface (API) based lifecycle events during the transient state; and
        deriving a next set of configurable actions for provisioned resources by providing hooks to a provisioning service to get a compliance posture for the cloud resource in the transient state.

11. The computer program product of claim 10, further comprising configuring a configurable set of cloud native and third party services to access the cloud resource within the transient state for compliance checking.

12. The computer program product of claim 10, wherein the cloud resource is a cloud infrastructure resource, and the method further comprises maintaining a common set of security and compliance rules to be applied as proactive and reactive measures on the cloud infrastructure resource ensuring standardization and consistency with respect to other cloud infrastructure resources.

13. The computer program product of claim 10, further comprising performing API based lifecycle event management for cloud resources in transient states.

14. The computer program product of claim 10, further comprising validating the cloud resource in the transient state against security overrides.

15. The computer program product of claim 10, further comprising using a same set of automated tools for both proactive and reactive compliance on the cloud resource in the transient state without having to deploy separate toolsets for proactive and reactive compliance validations.

16. The computer program product of claim 10, wherein the cloud in the transient state is a pre-provisioned cloud resource.

17. The computer program product of claim 10, wherein the time-in-transient-state requirement uses a time threshold to ensure that the cloud resource is not in the transient state indefinitely.

18. The computer program product of claim 17, further comprising deprovisioning the cloud resource in the transient state responsive to the cloud resource in the transient state failing the time threshold of the time-in-transient-state requirement.

19. A computer processing system for Governance, Risk, Compliance (GRC) and security compliance in a cloud computing environment, comprising:
    a memory device for storing program code;

a hardware processor operatively coupled to the memory device for running the program code to:
    maintain a cloud resource to be in a transient state that keeps the cloud resource from being visible to other cloud resources for a configured rule driven duration during which validations comprising the GRC and security compliance are applied to the cloud resource;
    provision the cloud resource responsive to the cloud resource meeting a time-in-transient-state requirement and passing the GRC and security compliance;
  wherein the hardware processor maintains the cloud resource in the transient state by running the program code to:
    reuse reactive validations for further GRC and security compliance in a resource lifecycle leveraging Application Programming Interface (API) based lifecycle events during the transient state; and
    derive a next set of configurable actions for provisioned resources by providing hooks to a provisioning service to get a compliance posture for the cloud resource in the transient state.

20. The computer processing system of claim 19, wherein the hardware processor further runs the program code to configure a configurable set of cloud native and third party services to access the cloud resource within the transient state for compliance checking.

\* \* \* \* \*